United States Patent

Urushibata et al.

Patent Number: 5,100,574
Date of Patent: Mar. 31, 1992

[54] DEINKING AGENT

[75] Inventors: Hideaki Urushibata; Hiroyoshi Hiramatsu; Yoshitaka Miyauchi; Koji Hamaguchi, all of Wakayama, Japan

[73] Assignee: Kao Corporation, Tokyo, Japan

[21] Appl. No.: 431,187

[22] Filed: Nov. 3, 1989

[30] Foreign Application Priority Data

Nov. 18, 1988 [JP] Japan ................. 63-291952

[51] Int. Cl.$^5$ .................. C11D 3/43; D21C 5/02
[52] U.S. Cl. .................. 252/174.22; 252/174.21; 252/162; 162/5; 436/71
[58] Field of Search ............. 252/162, 174.22, 174.21; 436/71; 162/5

[56] References Cited

FOREIGN PATENT DOCUMENTS

| | | |
|---|---|---|
| 0241224 | 4/1987 | European Pat. Off. |
| 0239585 | 11/1985 | Japan . |
| 2243892 | 10/1987 | Japan . |
| 2250291 | 10/1987 | Japan . |
| 3050592 | 3/1988 | Japan . |
| 3182489 | 7/1988 | Japan . |
| 1062850 | 3/1967 | United Kingdom . |
| 1347971 | 5/1970 | United Kingdom . |

*Primary Examiner*—Prince Willis, Jr.
*Assistant Examiner*—John F. McNally
*Attorney, Agent, or Firm*—Birch, Stewart, Kolasch & Birch

[57] ABSTRACT

A deinking composition comprising a reaction product of a glyceride mixture, derived from natural oil and fat with ethylene oxide and propylene oxide. The glyceride mixture comprises 5 to 10 percent by weight of monoglycerides, 30 to 45 percent by weight of diglycerides and 50 to 70 percent by weight of triglycerides. The reaction product has a molar ratio of ethylene oxide to propylene oxide in the range of 1.8 to 2.2 and has, on average, from 30 to 80 moles of added ethylene oxide per mole of glycerides.

3 Claims, No Drawings

DEINKING AGENT

BACKGROUND OF THE INVENTION

1. Field of the Invention

The present invention relates to a deinking agent which is used for the reclamation of waste paper such as newspapers and magazines. More particularly, the present invention relates to a deinking agent which yields deinked pulp having a higher b value and containing a lower amount of sticky substance when used for the deinking treatment by floatation method, washing method, or a compromise method thereof.

2. Description of Related Art

The reclamation of waste paper such as newspapers and magazines is an old practice. An importance is being attached to the effective reclamation of waste paper because of the recent supply shortage and price hike of pulp sources. In addition, deinked pulp is finding more valuable uses than before. On the other hand, the reclamation of waste paper is becoming more difficult from the standpoint of deinking because of recent changes in printing technology, printing methods, and printing ink, as well as the utilization of waste paper which was never been reclaimed in the past. For more effective deinking, improvements are being made on the existing machine.

A variety of chemicals have been used to separate and remove ink and other impurities from waste paper. They include alkali agents (such as sodium hydroxide, sodium silicate, sodium carbonate, and sodium phosphate), bleaching agents (such as hydrogen peroxide, hyposulfite, hypochlorite), and sequestering agents (such as EDTA and DTPA), and deinking agent. Examples of the deinking agent include anionic surface active agents (such as alkylbenzenesulfonate, higher alcohol sulfate ester salt, α-olefinsulfonate, and dialkylsulfosuccinate) and nonionic surface active agents (such as an adduct of a higher alcohol, an alkylphenol or a fatty acid and an alkanolamide). These agents may be used singularly or in combination with one another.

Unfortunately, the conventional deinking agent is poor in ink catching performance although it is good in foaming performance when used in the floatation process. Also, when it is used in the washing process, it is poor in detergency and generates a large amount of foam which causes trouble during draining. Thus, with the conventional deinking agent it was only possible to obtain deinked pulp of low grade.

Moreover, deinked pulp obtained by using the conventional deinking agent is limited in its application area because it looks dark and dull. Thus, it can only be used in a reduced amount in paper board and newsprint paper. To eliminate the dull appearance, it is necessary to use more bleaching agent than is required for deinking. One way of producing deinked pulp having a bright color tone is to increase the b value. It is possible to increase the b value if an alkaline agent is used in large quantities. However, this increases the amount of sticky substances and the water discharge load an makes the resulting pulp brittle. There has been no effective means to eliminate these disadvantages.

The present inventors proposed using as a deinking agent a reaction product obtained by adding an alkylene oxide to a mixture composed of a natural fat or oil and a tri- or polyhydric alcohol (See Japanese Patent Laid-open No. 239585/1985.)

After careful examination of its behavior in the deinking process, it was found that an agent composed of a natural fat or oil and a tri-or polyhydric alcohol in a molar ration of 1:0.5 to 1:3 causes foaming troubles in the floatation step, dehydration step, draining step, and papermaking step. Moreover, it does not completely eliminate the dull appearance although it does provide deinked pulp having a high degree of whiteness.

SUMMARY OF THE INVENTION

The present inventors carried out a series of researches on the development of a deinking agent which will exhibit the outstanding ink removing performance without foaming trouble in the floatation method or washing method or a compromise method thereof, and provide deinked pulp having a high b value (without dull appearance) and containing a lower amount of sticky substances. It was unexpectedly found that the above-mentioned requirements can be met when the deinking agent contains a specific nonionic surface active agent. This finding led to the present invention.

Accordingly, it is an object of the present invention to provide a deinking agent which comprises a natural fat or oil and an ethylene oxide/propylene oxide adduct of glyceride mixture composed of 5–10 wt % of monoglyceride, 30–45 wt % of diglyceride, and 50–70 wt % of triglyceride, said adduct containing ethylene oxide and propylene oxide in a molar ratio of 1.8–2.2 and also containing ethylene oxide in an amount of 30–80 mol.

DETAILED DESCRIPTION OF THE INVENTION

A deinking composition comprises a reaction product obtained by reacting a glyceride mixture derived from natural oil and fat with ethylene oxide and propylene oxide, (a) said glyceride mixture (a) comprising 5 to 10 percent by weight of monoglycerides, 30 to 45 percent by weight of diglycerides and 50 to 70 percent by weight of triglycerides, (b) said reaction product having a molar ratio of ethylene oxide to propylene oxide in the range between 1.8 and 2.2, (c) said reaction product having the mole number of added ethylene oxide in the range between 30 and 80 on the average based on a mole of glycerides.

The reaction is normally conducted with natural oil and fat, glycerine, propylene oxide and ethylene oxide in the presence of an alkali catalyst.

It is relatively free from sticky matters. It is preferred that the reaction is conducted with a mixture of ethylene oxide and propylene oxide and the product is a reaction product obtained by random addition reaction of both oxides.

The invention provides a method for reclamation of waste paper with the use of a deinking agent comprising the above defined reaction product and then the use of the reaction product for a deinking agent.

The fat and oil that can be used in the present invention include vegetable oils (such as coconut oil, palm oil, olive oil, soybean oil, rapeseed oil, linseed oil, castor oil, and sunflower oil), land animal fat and oil (such as lard, beef tallow, and bone oil), aquatic animal fat and oil (such as sardine oil and herring oil), hardened oil and semihardened oil thereof, and recovered oil obtained in the purification step for these fats and oils.

According to the present invention, the glyceride mixture should be composed of 5–10 wt % of monoglyceride, 30–45 wt % of diglyceride, and 50–70 wt % of triglyceride. The glyceride mixture meeting this requirement effectively removes fine ink particles and yields deinked pulp having a bright color tone free of dull appearance and hence having a high b value. If this requirement is not met, it will not eliminate the dull appearance completely from deinked pulp. This requirement may be met by mixing ready-made monoglyceride, diglyceride, and triglyceride in a desired ratio, or by adding glycerin to a natural fat or oil (triglyceride) for the ester interchange reaction that brings about the desired ratio.

According to the present invention, the addition of ethylene oxide and propylene oxide may be accomplished simultaneously (random addition) or sequentially (block addition), with the former being preferable from the standpoint of decreasing the foaming troubles.

According to the present invention, the addition of ethylene oxide and propylene oxide should be carried out in a molar ratio of 1.8 to 2.2, and the amount of ethylene oxide added should be 30 to 80 mol. If this requirement is not met, the resulting deinking agent is poor in the ability to remove ink from waste paper and also poor in foaming performance in the case of floatation treatment or in ink removing performance in the case of washing treatment. Thus, only by using a compound which meets the above-mentioned requirements can a deinked pulp having a high b value and containing a lower amount of sticky substances be obtained.

In the present invention, the adding ethylene oxide and propylene oxide is not specifically limited. The addition reaction may be carried out under the conditions which are usually employed when alkylene oxides are added to a compound containing an active hydrogen. Thus, the addition reaction involves the steps of charging glycerides in the above-mentioned ratio (by weight), adding a catalytic amount of alkaline substance to the glyceride mixture, and reacting the glyceride mixture with ethylene oxide and propylene oxide at about 100°-200° C. for several hours un of 1-3 kg/cm$^2$G.

The deinking agent of the invention may be advantageously used in combination any known deinking agent such as high alcohol sulfate, alkylbenzenesulfonate, higher alcohol, and ethylene adduct of alkylphenol. The deinking agent of the present invention may be added in portions to any or all of the waster paper breaking step, high-consistency bleaching step, and floatation preliminary step. It should be added an amount of 0.03 to 1.0 wt % of the amount of waste paper.

EXAMPLES

The invention will be described in more detail with reference to the following manufacturing examples and working examples, which are not intended to restrict the scope of the invention.

MANUFACTURING EXAMPLE 1

In a 1.5-liter autoclave were placed 16.2 g of monoglyceride of coconut oil, 52.0 g of diglyceride of coconut oil, 97.2 g of triglyceride of coconut oil, and 1.9 g of 100% KOH. The contents were heated to 150° C. with stirring at about 600 rpm. To the glycerides was slowly added 479.9 g of ethylene oxide at 150°-160° C. under a pressure of 1-3 kg/cm$^2$G. After the completion of the addition reaction of ethylene oxide, the reaction system was cooled to 120°-130° C., and 350.9 g of propylene oxide was added under a pressure of 1-3 kg/cm$^2$G. The reaction product was cooled to 80° C. and neutralized to pH 6 with acetic acid. The yield of the reaction product (No. 1 in Table 1) was 97%.

MANUFACTURING EXAMPLE 2

In a 1.5-liter autoclave were placed 9.3 g of monoglyceride of beef tallow, 69.1 g of diglyceride of beef tallow, 103.3 g of triglyceride of beef tallow, and 1.9 g of 100% KOH. The contents were heated to 130° C. with stirring at about 600 rpm. To the glycerides was added 814.5 g of a mixture composed of ethylene oxide and propylene oxide in a molar ratio of 2:1. The addition reaction was carried out at 130°-140° C. under a pressure of 1-3 kg/cm$^2$G. After the completion of the addition reaction, the reaction system was cooled to 80° C. and neutralized to pH 6 with acetic acid. The yield of the reaction product (No. 20 in Table 2) was 98%.

EXAMPLE 1

Various deinking agents as shown in Table 1 were evaluated in the following manner. Waste paper composed of 50 wt % of news and 50 wt % of magazine was cut into small pieces (2×5 cm), and a certain amount of cut waste paper was placed in a desk-top breaker. To the breaker were added water, 1.0% of sodium hydroxide, 2.5% of sodium silicate No. 3, 3.0% of 30% hydrogen peroxide, and 0.2% of the deinking agent shown in Table 1. (The percentage is based on the amount of waste paper.) Breaking was carried out in a 5% pulp concentration at 45° C. for 20 minutes, followed by aging at 45° C. for 60 minutes. After dilution with water to a pulp concentration of 1.0%, floatation was carried out at 30° C. for 10 minutes until the pulp slurry was concentrated to 6%. The pulp slurry was diluted with water to 1% and then made into a pulp sheet by means of a TAPPI standard sheet machine.

The thus obtained pulp sheet was tested for b value by the aid of a color difference meter and also for the number of sticky objects by the aid of an image analyzer (×40). The amount of foamy liquid (required to form the foam layer) which was generated during floatation was measured as a measure of foaming performance. (The more the foamy liquid, the lower the yield and the poorer the froth handling in the water treatment.)

The b value means the b value in the Lab color space of Hunter color difference. It has a relationship with the tristimulus values as represented by the following formula.

$$b = 7.0(Y - 0.847Z)/\sqrt{Y}$$

It is noted that the b value is a function of Y and Z, and positive b values indicate a yellowish tone and negative b values indicates a bluish tone.

Table 1 shows the ratio of the glycerides in each deinking agent and the performance of each deinking agent.

EXAMPLE 2

Various deinking agents as shown in Table 2 were evaluated in the following manner. Waste paper of magazine was cut into small pieces (2×5 cm), and a certain amount of cut waste paper was placed in a high-consistency pulper. To the pulper were added water, 0.5% of sodium hydroxide, 1.5% of sodium silicate No. 3, 1.0% of 30% hydrogen peroxide, and 0.05% of the deinking agent shown in Table 2. (The percentage is based on the amount of waste paper.) Breaking was carried out in a 15% pulp concentration at 45° C. for 20 minutes. The pulp slurry was diluted with water to a pulp concentration of 4.0%, and further diluted with water to a pulp concentration of 1.0%. The pulp slurry was subjected to floatation at 30° C. for 10 minutes until the pulp slurry was concentrated to 6%. The pulp slurry was diluted with water to 1% and then made into a pulp sheet by means of a TAPPI standard sheet machine.

The thus obtained pulp sheet was tested for b value by the aid of a color difference meter and also for the number of sticky objects by the aid of an image analyzer (×40). The amount of foamy liquid (required to form the foam layer) which was generated during floatation was measured as a measure of foaming performance.

Table 2 shows the molar ratio of ethylene oxide and propylene oxide in each deinking agent and the performance of each deinking agent.

EXAMPLE 3

Various deinking agents as shown in Table 3 were evaluated in the following manner. Waste paper of magazine was cut into small pieces (2×5 cm), and a certain amount of cut waste paper was placed in a low-consistency pulper. To the pulper were added water, 0.5% of sodium hydroxide, 1.5% of sodium silicate No. 3, 1.0% of 30% hydrogen peroxide, and 0.06% of the deinking agent shown in Table 3. (The percentage is based on the amount of waste paper.) Breaking was carried out in a 4% pulp concentration at 40° C. for 15 minutes. The pulp slurry was diluted with water to a pulp concentration of 1.0%. The pulp slurry was subjected to floatation at 30° C. for 10 minutes until the pulp slurry was concentrated to 6%. The pulp slurry was diluted with water to 1% and then made into a pulp sheet by means of a TAPPI standard sheet machine.

The thus obtained pulp sheet was tested for b value by the aid of a color difference meter and also for the number of sticky objects by the aid of an image analyzer (×40). The amount of foamy liquid (required to form the foam layer) which was generated during floatation was measured as a measure of foaming performance.

Table 3 shows the amount (in mol) of ethylene oxide added to the glycerides in each deinking agent and the performance of each deinking agent.

EXAMPLE 4

Various deinking agents as shown in Table 4 were evaluated in the following manner. Waste paper composed of 50 wt % of news and 50 wt % of magazine was cut into small pieces (2×5 cm), and a certain amount of cut waste paper was placed in a desk-top breaker. To the breaker were added water, 0.8% of sodium hydroxide, 2.0% of sodium silicate No. 3, 2.0% of 30% hydrogen peroxide, and 0.5% of the deinking agent shown in Table 4. (The percentage is based on the amount of waste paper.) Breaking was carried out in a 5% pulp concentration at 50° C. for 15 minutes, followed by aging at 50° C. for 2 hours. After dilution with water to a pulp concentration of 1.0%, floatation was carried out at 30° C. for 10 minutes until the pulp slurry was concentrated to 6%. The pulp slurry was diluted with water to 1% and then made into a pulp sheet by means of a TAPPI standard sheet machine.

The thus obtained pulp sheet was tested for b value by the aid of a color difference meter and also for the number of sticky objects by the aid of an image analyzer (×40). The amount of foamy liquid (required to form the foam layer) which was generated during floatation was measured as a measure of foaming performance.

Table 4 shows the sequence of adding alkylene oxides to glycerides in each deinking agent and the performance of each deinking agent.

TABLE 1

| | | | Glyceride Ratio and Deinking Performance | | | | | |
|---|---|---|---|---|---|---|---|---|
| | | | Alkylene oxide | | | Deinked pulp | | |
| Example | Natural fat or oil | Ratio of glyceride mono/di/tri (wt %) | Compound* | EO/PO molar ratio | Number of moles of EO | b value (%) | Number of sticky objects | Foamy liquid (mL) |
| 1 | Coconut oil | 10/31/59 | EO/PO (block) | 1.8 | 33 | 9.80 | 3 | 420 |
| 2 | Hardened tallow | 9/41/50 | EO/PO (random) | 2.1 | 74 | 10.21 | 4 | 370 |
| 3 | Fish oil | 5/32/63 | EO/PO (block) | 1.9 | 58 | 9.65 | 3 | 450 |
| 4 | Beef tallow | 8/35/57 | EO/PO/EO (block) | 2.0 | 60 | 9.83 | 2 | 455 |
| (5) | Coconut oil | 12/32/66 | EO/PO (block) | 1.8 | 33 | 9.32 | 21 | 425 |
| (6) | Coconut oil | 4/42/54 | EO/PO (block) | 1.8 | 33 | 9.04 | 16 | 420 |
| (7) | Coconut oil | 5/46/49 | EO/PO (block) | 1.8 | 33 | 8.76 | 13 | 410 |
| (8) | Coconut oil | 6/28/66 | EO/PO (block) | 1.8 | 33 | 9.24 | 15 | 415 |
| (9) | Coconut oil | 8/30/72 | EO/PO (block) | 1.8 | 33 | 9.34 | 19 | 440 |
| (10) | Coconut oil | 10/42/48 | EO/PO (block) | 1.8 | 33 | 8.76 | 14 | 415 |
| (11) | Hardened tallow | 15/30/55 | EO/PO (random) | 2.1 | 74 | 9.12 | 16 | 420 |
| (12) | Hardened tallow | 2/40/58 | EO/PO (random) | 2.1 | 74 | 9.27 | 13 | 345 |
| (13) | Hardened tallow | 6/50/43 | EO/PO (random) | 2.1 | 74 | 8.67 | 12 | 405 |
| (14) | Hardened tallow | 6/25/69 | EO/PO (random) | 2.1 | 74 | 9.32 | 21 | 355 |
| (15) | Hardened tallow | 9/16/75 | EO/PO (random) | 2.1 | 74 | 9.34 | 15 | 365 |
| (16) | Hardened tallow | 9/45/46 | EO/PO (random) | 2.1 | 74 | 8.73 | 10 | 405 |
| (17) | | | Ammonium stearate | | | 9.03 | 17 | 120 |
| (18) | | | Polyoxyethylene (15 mol) polyoxypropylene (9 mol) lauryl ether | | | 7.45 | 23 | 855 |
| (19) | | | Sodium dedecylbenzenesulfonate | | | 7.56 | 29 | 460 |

*EO: ethylene oxide, PO: propylene oxide; Parenthesized number indicate Comparative Examples.

TABLE 2

Molar Ratio of Ethylene Oxide and Propylene Oxide and Deinking Performance

| Example | Natural fat or oil | Ratio of glyceride mono/di/tri (wt %) | Alkylene oxide Compound* | EO/PO molar ratio | Number of moles of EO | Deinked pulp b value (%) | Number of sticky objects | Foamy liquid (mL) |
|---|---|---|---|---|---|---|---|---|
| 20 | Beef tallow | 5/38/57 | EO/PO (random) | 2.0 | 42 | 7.87 | 5 | 260 |
| 21 | Linseed oil | 6/39/55 | EO/PO (block) | 1.8 | 74 | 7.36 | 3 | 355 |
| 22 | Rapeseed oil | 7/40/53 | EO/PO (block) | 2.2 | 32 | 7.93 | 3 | 320 |
| (23) | Beef tallow | 5/38/67 | EO/PO (random) | 2.5 | 42 | 7.07 | 16 | 270 |
| (24) | Beef tallow | 5/38/67 | EO/PO (random) | 1.7 | 42 | 7.01 | 13 | 270 |
| (25) | Linseed oil | 6/39/55 | EO/PO (block) | 2.3 | 74 | 6.83 | 10 | 350 |
| (26) | Linseed oil | 6/39/55 | EO/PO (block) | 1.5 | 74 | 6.80 | 14 | 355 |
| (27) | Rapeseed oil | 7/40/53 | EO/PO (block) | 2.4 | 32 | 6.68 | 10 | 320 |
| (28) | Rapeseed oil | 7/40/53 | EO/PO (block) | 1.6 | 32 | 6.65 | 9 | 325 |

*EO: ethylene oxide, PO: propylene oxide. Parenthesized number indicate Comparative Examples

TABLE 3

Number of Moles of Ethylene Oxide Added and Deinking Performance

| Example | Natural fat or oil | Ratio of glyceride mono/di/tri (wt %) | Alkylene oxide Compound* | EO/PO molar ratio | Number of moles of EO | Deinked pulp b value (%) | Number of sticky objects | Foamy liquid (mL) |
|---|---|---|---|---|---|---|---|---|
| 29 | Olive oil | 6/32/62 | EO/PO/EO (block) | 2.05 | 58 | 7.45 | 6 | 450 |
| 30 | Bone oil | 5/30/65 | EO/PO (random) | 2.1 | 40 | 7.38 | 4 | 320 |
| 31 | Soybean oil | 9/40/51 | EO/PO (random) | 1.9 | 60 | 7.82 | 3 | 340 |
| (32) | Olive oil | 6/32/62 | EO/PO/EO (block) | 2.05 | 28 | 6.98 | 12 | 430 |
| (33) | Olive oil | 6/32/62 | EO/PO/EO (block) | 2.05 | 82 | 6.86 | 11 | 670 |
| (34) | Bone oil | 5/30/65 | EO/PO (random) | 2.1 | 29 | 7.01 | 16 | 315 |
| (35) | Bone oil | 5/30/65 | EO/PO (random) | 2.1 | 81 | 6.92 | 13 | 385 |
| (36) | Soybean oil | 9/40/51 | EO/PO (random) | 1.9 | 28 | 6.34 | 12 | 325 |
| (37) | Soybean oil | 9/40/51 | EO/PO (random) | 1.9 | 101 | 6.38 | 10 | 390 |

*EO: ethylene oxide, PO: propylene oxide. Parenthesized number indicate Comparative Examples.

TABLE 4

Sequence of Addition of Alkylene Oxides and Deinking Performance

| Example | Natural fat or oil | Ratio of glyceride mono/di/tri (wt %) | Alkylene oxide Compound* | EO/PO molar ratio | Number of moles of EO | Deinked pulp b value (%) | Number of sticky objects | Foamy liquid (mL) |
|---|---|---|---|---|---|---|---|---|
| 38 | Beef tallow | 5/33/62 | EO/PO (random) | 2.0 | 58 | 9.81 | 5 | 365 |
| 39 | Fish oil | 8/34/58 | EO/PO (random) | 1.8 | 35 | 9.36 | 2 | 320 |
| (40) | Beef tallow | 5/33/62 | EO/PO (block) | 2.0 | 58 | 9.60 | 8 | 420 |
| (41) | Fish oil | 8/34/58 | EO/PO (block) | 1.8 | 35 | 9.05 | 5 | 375 |
| (33) | Olive oil | 6/32/62 | EO/PO/EO (block) | 2.05 | 82 | 6.86 | 11 | 670 |
| (34) | Bone oil | 5/30/65 | EO/PO (random) | 2.1 | 29 | 7.01 | 16 | 315 |
| (35) | Bone oil | 5/30/65 | EO/PO (random) | 2.1 | 81 | 6.92 | 13 | 385 |
| (36) | Soybean oil | 9/40/51 | EO/PO (random) | 1.9 | 28 | 6.34 | 12 | 325 |
| (37) | Soybean oil | 9/40/51 | EO/PO (random) | 1.9 | 101 | 6.38 | 10 | 390 |

*EO: ethylene oxide, PO: propylene oxide. Parenthesized number indicate Comparative Examples The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A deinking composition which comprises a reaction product obtained by reacting a glyceride mixture from a natural oil or a fat with ethylene oxide and propylene oxide, (a) said glyceride mixture comprising 5 to 10 percent by weight of monoglycerides, 30 to 45 percent by weight of diglycerides and 50 to 70 percent by weight of triglycerides, (b) said reaction product having a molar ratio of ethylene oxide to propylene oxide in the range of between 1.8 and 2.2, (c) said reaction product having on the average from 30 to 80 moles of added ethylene oxide per mole of glycerides.

2. The composition as claimed in claim 1, in which the reaction is conducted with natural oil and fat, glycerine, propylene oxide and ethylene oxide in the presence of an alkali catalyst.

3. The composition as claimed in claim 1, in which the reaction is conducted with a mixture of ethylene oxide and propylene oxide and the product is a reaction product obtained by random addition reaction of both oxides.

* * * * *